(12) United States Patent
Ala et al.

(10) Patent No.: US 12,024,646 B2
(45) Date of Patent: Jul. 2, 2024

(54) ORGANOPHOSPHORUS ACID FUNCTIONALIZED LATEX AND AN AMINOSILANE

(71) Applicants: Rohm and Haas Company, Collegeville, PA (US); Dow Global Technologies LLC, Midland, MI (US)

(72) Inventors: Azize Ala, East Norriton, PA (US); Gary Dombrowski, Chester Springs, PA (US); Patrick E. Hartnett, Malvern, PA (US); Ozzie Moore Pressley, Collegeville, PA (US); Qing Zhang, Collegeville, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 630 days.

(21) Appl. No.: 17/277,839

(22) PCT Filed: Oct. 8, 2019

(86) PCT No.: PCT/US2019/055084
§ 371 (c)(1),
(2) Date: Mar. 19, 2021

(87) PCT Pub. No.: WO2020/076742
PCT Pub. Date: Apr. 16, 2020

(65) Prior Publication Data
US 2021/0347979 A1    Nov. 11, 2021

Related U.S. Application Data

(60) Provisional application No. 62/742,629, filed on Oct. 8, 2018.

(51) Int. Cl.
*C09D 5/02* (2006.01)
*C08K 5/544* (2006.01)
*C08L 43/02* (2006.01)
*C09D 143/02* (2006.01)

(52) U.S. Cl.
CPC .............. *C09D 5/022* (2013.01); *C08L 43/02* (2013.01); *C09D 143/02* (2013.01); *C08K 5/544* (2013.01); *C08L 2201/54* (2013.01)

(58) Field of Classification Search
CPC ..... C09D 143/02; C08L 43/02; C08L 143/02; C08K 5/544
See application file for complete search history.

(56) References Cited

U.S. PATENT DOCUMENTS

| | | | |
|---|---|---|---|
| 5,527,619 A | 6/1996 | Rokowski et al. | |
| 6,080,802 A * | 6/2000 | Emmons | C09D 17/008 523/205 |
| 6,485,786 B2 * | 11/2002 | Deng | C09D 133/062 427/385.5 |
| 8,815,997 B2 | 8/2014 | Zhang et al. | |

FOREIGN PATENT DOCUMENTS

| | | | |
|---|---|---|---|
| EP | 0544569 | 6/1993 | |
| EP | 2918615 | 9/2015 | |
| JP | 2008222954 A * | 9/2008 | |
| JP | 4792052 B2 * | 10/2011 | ............ C08F 220/14 |

OTHER PUBLICATIONS

Machine translation of JP 4792052 (2011, pages).*
Machine translation of JP 2008222954 (2008, pages).*

* cited by examiner

*Primary Examiner* — Brieann R Johnston
(74) *Attorney, Agent, or Firm* — Reid S. Willis

(57) ABSTRACT

The present invention relates to a composition comprising a) an aqueous dispersion of polymer particles comprising structural units of a phosphorus acid monomer or a salt thereof; and b) an aminosilane. The composition is effective for improving block resistance in such pigmented coating formulations.

8 Claims, No Drawings

ORGANOPHOSPHORUS ACID FUNCTIONALIZED LATEX AND AN AMINOSILANE

BACKGROUND

The present invention provides a composition comprising an organophosphorus acid functionalized latex and an aminosilane; the composition is useful for delivering stain blocking performance.

Historically, reactive pigments such as ZnO or barium metaborate, or other cationic additives have been used to improve stain blocking in films prepared from waterborne coating compositions. It is believed that these pigments bind stain molecules, which are typically anionic, thereby preventing stains from leeching through the film; however, according to U.S. Pat. No. 5,527,619 (Rokowski) reactive pigments "can cause stability problems, such as viscosity increase and polymer gelation, and are known to be environmentally unfriendly."

Other efforts directed toward improving stain blocking have focused on improving the barrier properties of the coating through the use of hydrophobic and low molecular weight emulsion polymers. These attempts have been only partially successful; achieving stain block performance equivalent to solvent-based alkyd resins has remained elusive.

Rokowski further discloses aqueous coating compositions comprising an aminosilane and an emulsion polymer to deliver improved stain blocking performance in a primer; however, as will be demonstrated in the present application, these coating compositions are not effective at blocking stains when used in a paint and primer in one formulation. It would therefore be advantageous to discover a waterborne coating composition that is effective for improving block resistance in such a formulation.

SUMMARY OF THE INVENTION

The present invention addresses a need in the art by providing a composition comprising a) an aqueous dispersion of polymer particles comprising, based on the weight of the polymer particles from 0.2 to 5 weight percent structural units of a phosphorus acid monomer or a salt thereof; and b) from 0.05 to 5 weight percent, based on the weight of the polymer particles, of an aminosilane, which is a compound that contains a primary, a secondary, or a tertiary amino group, or a quaternary ammonium group separated by 2 to 6 carbon atoms, from an Si—O group or a group that is hydrolyzable to an Si—O group. The composition of the present invention provides effective stain blocking without the use environmentally unfriendly reactive pigments.

DETAILED DESCRIPTION OF THE INVENTION

The present invention is a composition comprising a) an aqueous dispersion of polymer particles comprising, based on the weight of the polymer particles from 0.2 to 5 weight percent structural units of a phosphorus acid monomer or a salt thereof; and b) from 0.05 to 5 weight percent, based on the weight of the polymer particles, of an aminosilane, which is a compound that contains a primary, a secondary, or a tertiary amino group, or a quaternary ammonium group separated by 2 to 6 carbon atoms, from an Si—O group or a group that is hydrolyzable to an Si—O group.

The polymer particles can be acrylic, styrene-acrylic, vinyl acetate-ethylene, or vinyl acetate-acrylic polymers. Preferably, the polymer particles are acrylic based polymer particles comprising, based on the weight of the polymer particles, at least 30 weight percent structural units of methacrylate monomers such as methyl methacrylate, ethyl methacrylate, and butyl methacrylate; and/or acrylate monomers such as methyl acrylate, ethyl acrylate, n-butyl acrylate, 2-propylheptyl acrylate, and 2-ethylhexyl acrylate.

As used herein, the term "structural unit" of the named monomer refers to the remnant of the monomer after polymerization. For example, a structural unit of methyl methacrylate is as illustrated:

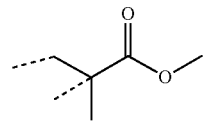

Structural Unit of Methyl Methacrylate where the dotted lines represent the points of attachment of the structural unit to the polymer backbone.

The polymer particles preferably have a z-average particle size, as measured by a Brookhaven BI 90 Particle Size Analyzer, in the range of from 50 nm, more preferably from 70 nm, and most preferably from 80 nm to 500 nm, more preferably to 400 nm, and most preferably to 300 nm.

Suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkylacrylates and hydroxyalkylmethacrylates, including phosphoethyl methacrylate and phosphopropyl methacrylate, with phosphoethyl methacrylate being especially preferred. Phosphoethyl methacrylate (PEM) is used herein to refer to the following structure:

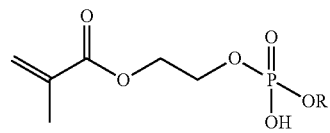

where R is H or

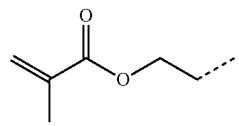

Another class of suitable phosphorus acid monomer is an allyl ethylene oxide phosphate of the following formula:

where y is from 3 to 5 and X is Li, Na, K, or $NH_4^+$. A commercially available example of an allyl ethylene oxide phosphate is Sipomer PAM-5000 monomer.

Polymer particles that comprise structural units of a phosphorus acid monomer or a salt thereof are said to be polymer particles polymers functionalized with organophosphorus acid groups.

The aminosilane is a compound that contains a primary, a secondary, or a tertiary amino group, or a quaternary ammonium group separated by 2 to 6 carbon atoms, preferably 3 carbon atoms, from an Si—O group or a group that is hydrolyzable to an Si—O group (such as an SiH or SiCl group). More preferably, the aminosilane is illustrated by the following structure:

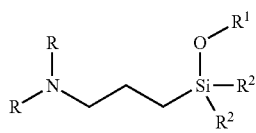

where each R is independently H, $C_1$-$C_3$-alkyl, phenyl, or 2-aminoethyl; $R^1$ is $C_1$-$C_3$-alkyl or $C(O)CH_3$; and each $R^2$ is independently H, $C_1$-$C_3$-alkyl, $C_1$-$C_3$-alkoxy, or O—C(O) $CH_3$.

Examples of suitable aminosilanes include N-methylaminopropyltrimethoxysilane, 2-aminoethyl-3-aminopropylmethyldimethoxysilane, aminopropyldimethylethoxysilane, N-2-aminoethyl-3-aminopropyltrimethoxysilane, 3-aminopropylmethyldimethoxysilane, 3-aminopropyltriethoxysilane, 3-aminopropyltrimethoxysilane, and N,N-dimethylaminopropyltrimethoxysilane.

The composition of the present invention is especially useful in providing stain blocking in pigmented coating compositions, for example, latex compositions that further comprise $TiO_2$. The composition advantageously further comprises a pigment, a rheology modifier and one or more additives selected from the group consisting of dispersants, surfactants, neutralizing agents, defoamers, extenders, opaque polymers, and coalescents.

It has been surprisingly been discovered that an aqueous composition comprising the combination of an aminosilane and a dispersion of polymer particles functionalized with organophosphorus acid groups shows significant improvement in stain blocking over compositions that comprise polymer particles functionalized with organophosphorus acid groups but no aminosilane, or a composition comprising an aminosilane and polymer particles not functionalized with organophosphorus acid groups.

Comparative Example 1—Preparation of a Latex

A monomer emulsion (ME1) was prepared from deionized water (670 g), Disponil FES 993 emulsifier (FES 993, 22.5 g), butyl acrylate (BA, 825 g), methyl methacrylate (MMA, 645 g), and glacial methacrylic acid (MAA, 30 g). To a 5-L 4-neck flask equipped with a mechanical stirrer, a reflux condenser, a thermocouple, and inlets for monomer emulsion and initiator solution was added deionized water (750 g) and FES 993 (5.77 g). The contents of the flask were stirred and heated to 82° C. A seed charge consisting of a portion of ME1 (76.3 g) was added to the flask followed by an initiator solution consisting of deionized water (10 g) and sodium persulfate (3.75 g). The seed charge and the initiator solution were rinsed to the flask with deionized water. Polymerization of the seed charge was monitored by a thermocouple and when the temperature of the reaction mixture peaked, the remainder of ME1 as well as a second initiator solution consisting of deionized water (200 g), sodium persulfate (0.75 g), and sodium carbonate (10.5 g) were fed into the reactor monotonically over 150 min, while the reactor temperature was controlled at 85° C. After completion of the feeds, the ME1 and initiator solution were rinsed into the flask using deionized water and the reactor was held at 85° C. for 10 min. The reactor was cooled to 80° C., then a solution of ferrous sulfate heptahydrate (0.02 g) and ethylenediaminetetraacetic acid tetrasodium salt (0.02 g) in deionized water (5 g) was added to the flask and rinsed with deionized water. Residual monomer in the reaction mixture was polymerized by feeding a solution of t-butyl hydroperoxide (4 g) in deionized water (20 g); a separate solution of isoascorbic acid (2.2 g) in deionized water (20 g) was added to the flask over 20 min while cooling the reaction mixture to 55° C. After the feeds were complete the reaction mixture was cooled to 30° C. and neutralized to pH 8 using ammonium hydroxide solution. Once neutralized, a solution consisting of KATHON™ LX 1400 Preservative (0.36 g), FES 993 (21.73 g), and deionized water (8.19 g) was added to the flask. The resulting latex was filtered to remove coagulum. The measured solids of the resulting latex was 45.7%.

Comparative Example 2—Preparation of a Latex with an Aminosilane

The procedure of Comparative Example 1 was followed except that 1 weight % 2-aminoethyl-3-aminopropyltrimethoxysilane (2.29 g, 1 weight percent based on latex solids) was added to a portion of the final latex (500 g).

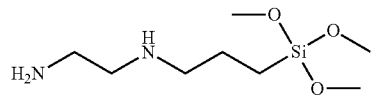

2-Aminoethyl-3-aminopropyltrimethoxysilane

Comparative Example 3—Preparation of a PEM-Functionalized Latex

The procedure was carried out as described for Comparative Example 1 except that the monomers composing ME1 were butyl acrylate (BA, 825 g), methyl methacrylate (MMA, 637.5 g), and phosphoethyl methacrylate (PEM, 22.5 g, 60% active); and the second initiator solution was composed of sodium persulfate (0.75 g) and sodium carbonate (2.5 g) in deionized water (200 g). The measured solids of the resulting latex was 45.6%.

Example 1—Preparation of a PEM-Functionalized Latex with 1% 2-Aminoethyl-3-aminopropyltrimethoxysilane The procedure of Comparative Example 3 was followed except that 1 weight % 2-aminoethyl-3-aminopropyltrimethoxysilane, based on latex solids, was added to the latex.

Example 2—Preparation of a PEM-Functionalized Latex with 1% 2-Aminoethyl-3-aminopropylmethyldimethoxysilane The procedure of Comparative Example 3 was followed except that 1 weight % 2-aminoethyl-3-aminopropylmethyl dimethoxysilane, based on latex solids, was added to the final latex.

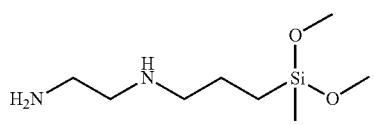

2-Aminoethyl-3-aminopropylmethyldimethoxysilane

Example 3—Preparation of a PEM-Functionalized Latex with 1% Aminopropyltriethoxysilane The procedure of Comparative Example 3 was followed except that 1 weight % 3-aminopropyltriethoxysilane, based on latex solids, was added to the final latex.

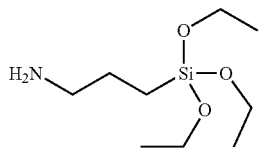

3-Aminopropyltriethoxysilane

Example 4—Preparation of a PEM-Functionalized Latex with 1% N-Methylaminopropyltrimethoxysilane The procedure of Comparative Example 3 was followed except that 1 weight % N-Methylaminopropyltrimethoxysilane, based on latex solids, was added to the final latex.

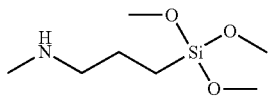

N-Methylaminopropyltrimethoxysilane

Example 5—Preparation of a PEM-Functionalized Latex with 1% N,N-Dimethylaminopropyl Trimethoxysilane The procedure of Comparative Example 3 was followed except that 1 weight % N,N-dimethylaminopropyl Trimethoxysilane, based on latex solids, was added to the final latex.

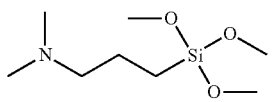

N,N-Dimethylaminopropyltrimethoxysilane

Example 6—Preparation of a PEM-Functionalized Latex with 1% Aminopropyldimethylethoxysilane

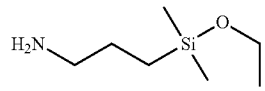

Aminopropyldimethylethoxysilane

The procedure of Comparative Example 3 was followed except that 1 weight % aminopropyldimethylethoxysilane, based on latex solids, was added to the final latex.

Paint formulations (Comparative Examples 1a-3a, and Examples 1a-5a) were prepared as shown in Table 1 by adding the components to a container in the order listed. The amounts used were the same for formulations prepared using the binder from Comparative Examples 1-3 and Examples 1-5 except where indicated. PVC refers to pigment volume concentration. In the following Table 1, AMP-75 refers to 2-amino-2-methyl-1-propanol; 15-S-40 refers to TERGITOL™ 15-S-9 Surfactant; A-2434 refers to Foamstar A-2434 Defoamer; RM-3000 refers to ACRYSOL™ RM-3000 Rheology Modifier; Ultra EF refers to ROPAQUE™ Ultra EF Opaque Polymer; RM-995 refers to ACRYSOL™ RM-995 Rheology Modifier; Dispersant refers to TAMOL™ 2011 Dispersant (TERGITOL, ROPAQUE, TAMOL and ACRYSOL are trademarks of The Dow Chemical Company or its Affiliates).

TABLE 1

| Interior Semi-Gloss Paint Formulation | | | |
|---|---|---|---|
| Material Name | Wt (g) | Level (%) | PVC |
| Grind | | | |
| Kronos 4311 TiO$_2$ | 310.02 | | 19.92 |
| Dispersant | 6 | 0.6 | |
| AMP-75 | 0.6 | | |
| 15-S-40 (20%) | 20.01 | | |
| A-2434 | 1.00 | | |
| RM-3000 | 15 | | |
| Minex 10 Extender | 18.62 | | 2.37 |
| ASP-170 Extender | 18.62 | | 2.40 |
| Letdown | | | |
| Latex | * | | |
| Water | 50.02 | | |
| Add Grind Here | | | |
| Ultra EF | 20 | | 3.3 |
| A-2434 | 0.5 | | |
| Propylene Glycol | 6 | | |
| Texanol | 5.02 | 2 | |
| RM-3000 | * | | |
| RM-995 | * | | |
| Water | * | | |

* The amounts of water, latex, RM-3000, and RM-995 used to prepare the semi-gloss formulations are illustrated in Table 2.

TABLE 2

Semi-gloss Paint Formulations

| Latex Ex. # | Water (g) | Latex (g) | RM-995 (g) | RM-3000 (g) | Paint Ex. # |
|---|---|---|---|---|---|
| Comp. 1 | 36.43 | 535.70 | 5.6 | 20 | Comp. 1a |
| Comp. 2 | 33.4 | 526.44 | 5.2 | 24 | Comp. 2a |
| Comp. 3 | 41.4 | 535.70 | 2.4 | 18.8 | Comp. 3a |
| Ex. 1 | 42.9 | 535.70 | 2.4 | 16.8 | Ex. 1a |
| Ex. 2 | 43.75 | 534.52 | 2.4 | 16.8 | Ex. 2a |
| Ex. 3 | 43.75 | 534.52 | 2.4 | 16.8 | Ex. 3a |
| Ex. 4 | 43.75 | 534.52 | 2.4 | 16.8 | Ex. 4a |
| Ex. 5 | 43.75 | 534.52 | 2.4 | 16.8 | Ex. 5a |
| Ex. 6 | 43.75 | 534.52 | 2.4 | 16.8 | Ex. 6a |

Marker Stain Blocking Test:

The formulations were evaluated for Marker Stain Blocking by the following method, adapted from ASTM D 7514-14:

A flat interior test paint was drawn down with a 75-μm (3-mil) Bird film applicator over white Leneta Penopac WB plain white chart and dried for 7 d at 25° C. and 50% relative humidity. A marker stain (Blue Hydrophilic Crayola Washable Marker) was applied to a dried film across the width of the film and the marker was allowed to dry for 4 d. To assess marker stain blocking, a drawdown of the test paint and the control paint were made side-by-side perpendicular to the marker stain using a 75-μm (3-mil) Bird film applicator, and the film was allowed to dry overnight; then a second coat was similarly applied using a 178-μm (7-mil) "U" shaped straddle bar film applicator, and then the film was allowed to dry overnight.

Marker stain blocking was measured using an X-Rite Spectrophotometer Model Ci7. This equipment was used to measure the color change of the unstained and stained area of the substrate which was covered by the paint coating as described above. The value used to express the degree of marker stain blocking is Delta E ($\Delta E$), which is the total color difference represented by a factual sum of 'a', and 'b' values such that:

$$\Delta E = (\Delta_L^2 + \Delta_a^2 + \Delta b^2)^{1/2}$$

'L' is a measure of color intensity; L=100 is equivalent to white, and L=0 is equivalent to black; "a" is a measure of the red and green color hues, wherein positive equates to red and negative equates to green; "b" is a measure of yellow and blue color hues, wherein positive equates to yellow and negative equates to blue. When measuring $\Delta E$ of the test paints and controls, lower $\Delta E$ indicate better marker stain blocking performance Results are shown in Table 3.

TABLE 3

$\Delta E$ Marker Stain Blocking Results of Paint Coatings

| Examples | $\Delta E$ Blue Marker |
|---|---|
| Comp. 1a | 9.9 |
| Comp. 2a | 10.5 |
| Comp. 3a | 9.9 |
| Ex. 1a | 3.3 |
| Ex. 2a | 3.2 |
| Ex. 3a | 3.0 |
| Ex. 4a | 4.1 |
| Ex. 5a | 4.2 |
| Ex. 6a | 5.6 |

The results show that when the paint formulation contained both an aminosilane and a PEM-functionalized latex (Examples 1a-5a), the value of $\Delta E$ is significantly lower than for the formulation that contained the PEM-functionalized latex and no aminosilane (Comparative 3a). The results therefore show improved marker stain blocking. The results of Comparative Example 2a versus Comparative Example 1a demonstrate that marker stain blocking was not improved when the paint formulation contained an aminosilane but the latex was not PEM-functionalized.

The invention claimed is:

1. A composition comprising a) an aqueous dispersion of polymer particles comprising, based on the weight of the polymer particles, from 0.2 to 5 weight percent structural units of a phosphorus acid monomer or a salt thereof; and b) from 0.05 to 5 weight percent, based on the weight of the polymer particles, of an aminosilane, which is a compound represented by the following structure:

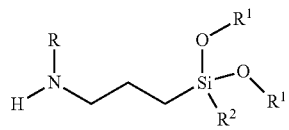

or a hydrolyzed compound thereof, where R is either H or 2-aminoethyl; each $R^1$ is $C_1$-$C_3$-alkyl or $C(O)CH_3$; and $R^2$ is $C_1$-$C_3$-alkyl, $C_1$-$C_3$-alkoxy, or O—$C(O)CH_3$.

2. The composition of claim 1 wherein the phosphorus acid monomer is phosphoethyl methacrylate or a salt thereof or an allyl ethylene oxide phosphate of the following formula:

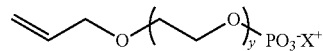

where y is from 3 to 5 and X is Li, Na, K, or $NH_4^+$.

3. The composition of claim 2 wherein the aminosilane is 2-aminoethyl-3-aminopropylmethyldimethoxysilane, N-2-aminoethyl-3-aminopropyltrimethoxysilane, or 3-aminopropyltriethoxysilane.

4. The composition of claim 3 which further includes a pigment, a rheology modifier, and one or more additives selected from the group consisting of dispersants, surfactants, neutralizing agents, defoamers, extenders, opaque polymers, and coalescents.

5. The composition of claim 1 where R is 2-aminoethyl; each $R^1$ is methyl; $R^2$ is methyl or methoxy; and the phosphorus acid monomer is phosphoethyl methacrylate or a salt thereof.

6. The composition of claim 1 where R is H; each $R^1$ is methyl; $R^2$ is methyl or methoxy; and the phosphorus acid monomer is phosphoethyl methacrylate or a salt thereof.

7. A composition comprising a) an aqueous dispersion of polymer particles comprising, based on the weight of the polymer particles, from 0.2 to 5 weight percent structural units of phosphoethyl methacrylate or a salt thereof; and b) from 0.05 to 5 weight percent, based on the weight of the polymer particles, of an aminosilane selected from the group consisting of 2-aminoethyl-3-aminopropylmethyldimethoxysilane, N-2-aminoethyl-3-aminopropyltrimethoxysilane, and 3-aminopropyltriethoxysilane, or a hydrolyzed compound thereof.

8. The composition of claim 7 which further includes a pigment, a rheology modifier, and one or more additives selected from the group consisting of dispersants, surfactants, neutralizing agents, defoamers, extenders, opaque polymers, and coalescents.

\* \* \* \* \*